Dec. 2, 1952 F. W. W. MORLEY ET AL 2,620,157
GAS-TURBINE ENGINE
Filed April 30, 1948 3 Sheets-Sheet 1
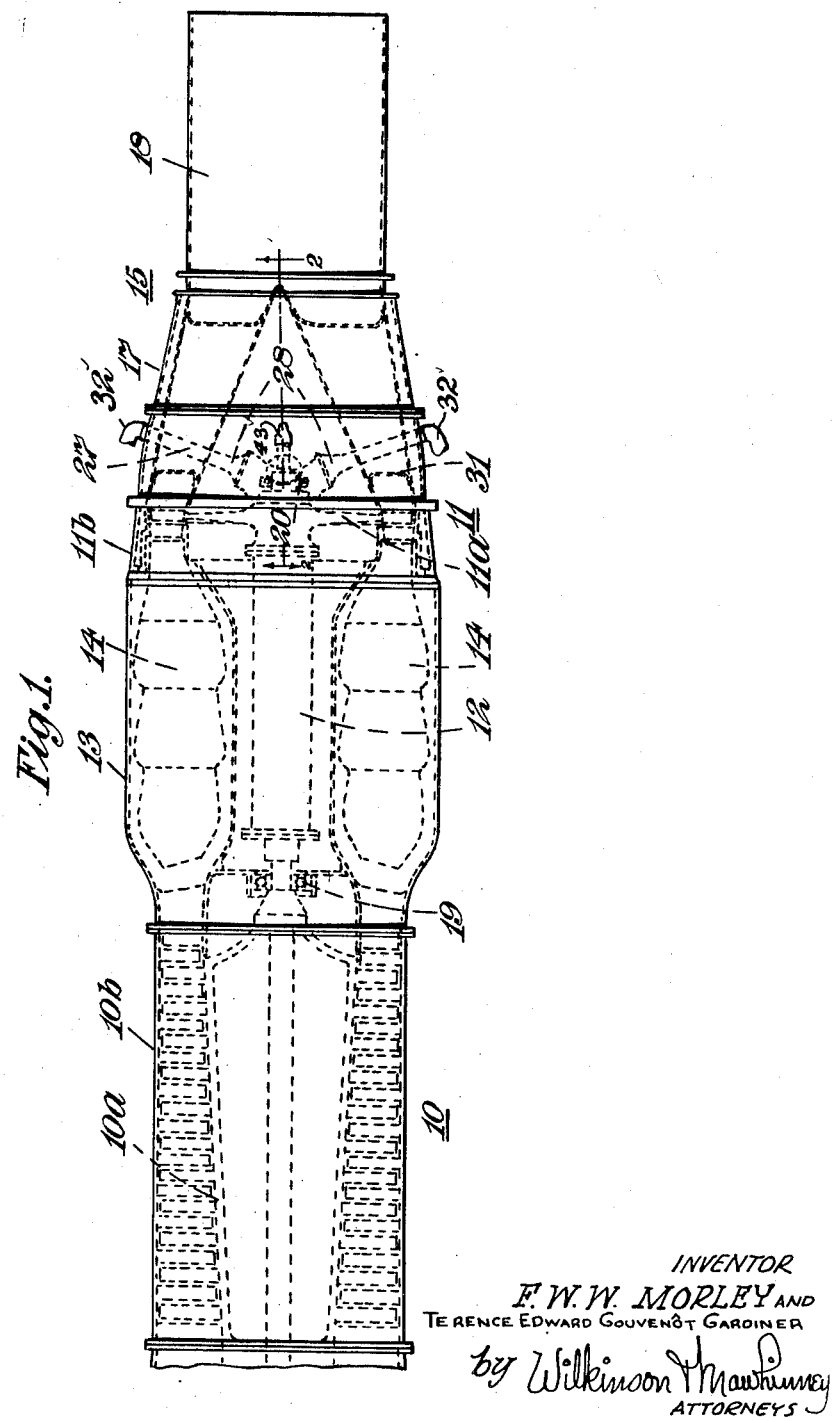
INVENTOR
F. W. W. MORLEY AND
TERENCE EDWARD GOUVENOT GARDINER
by Wilkinson Mawhinney
ATTORNEYS

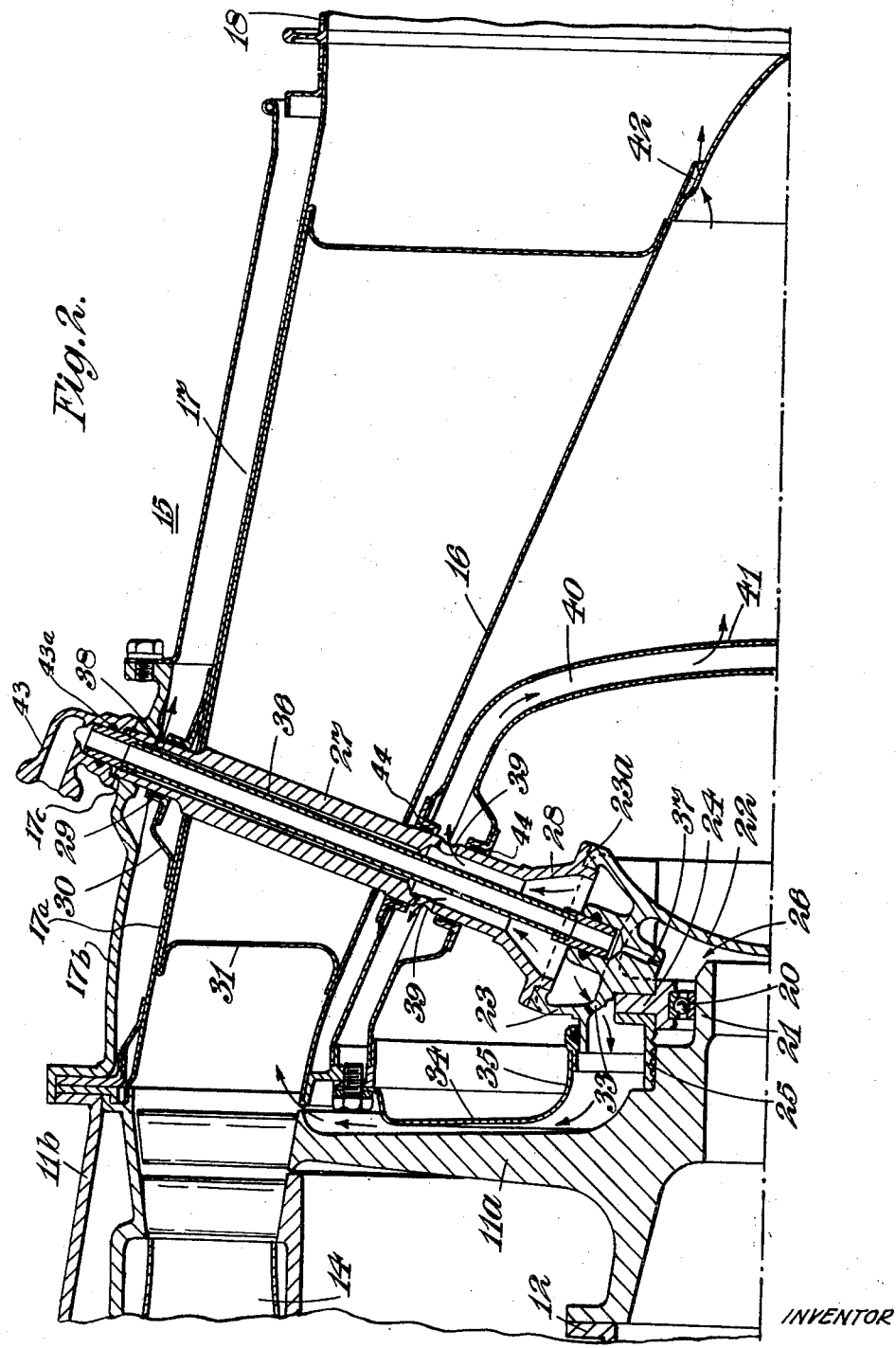

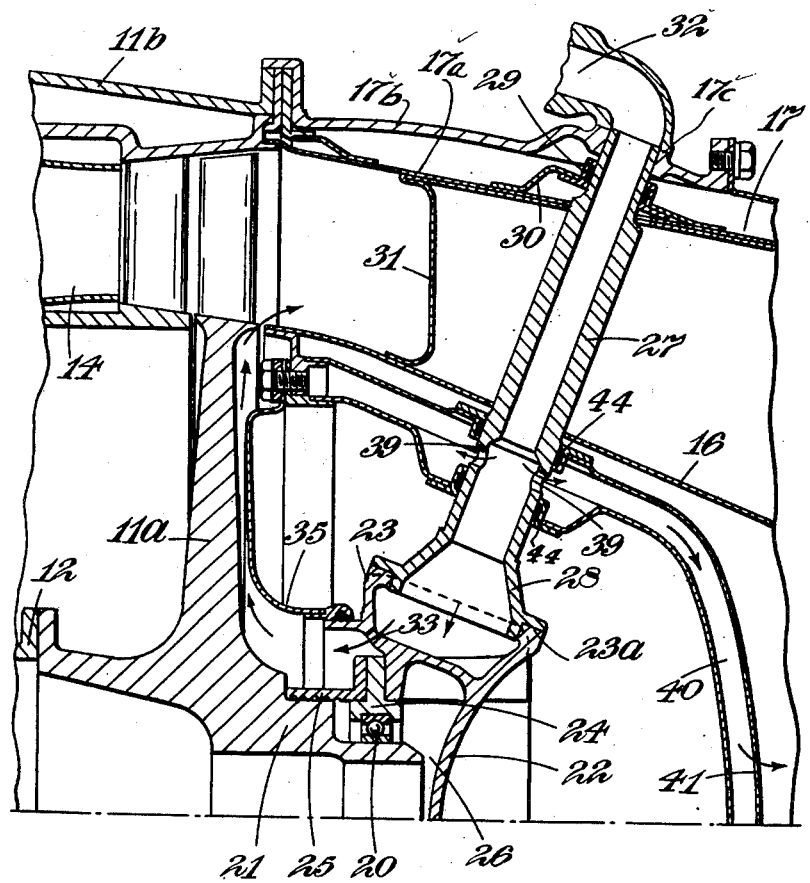

Patented Dec. 2, 1952

2,620,157

UNITED STATES PATENT OFFICE 2,620,157

GAS-TURBINE ENGINE

Frederick William Walton Morley, Aston-on-Trent, and Terence Edward Gouvenôt Gardiner, Shelton Lock, Derby, England, assignors to Rolls-Royce Limited, Derby, England, a British company Application April 30, 1948, Serial No. 24,156
In Great Britain May 6, 1947

8 Claims. (Cl. 253—39.15)

This invention relates to gas-turbine engines and is particularly concerned with such engines of the kind in which a bearing for the turbine rotor is located on the exhaust side of the rotor and is supported by the turbine stationary structure or by an exhaust duct structure which is secured to such stationary turbine structure.

Such an arrangement of the turbine bearing is especially although not exclusively applicable to gas-turbine engines of relatively small diametral dimension in which the reduced space available within an intermediate casing connecting the compressor casing and turbine casing does not readily permit the location of the turbine bearing on the upstream side of the turbine.

According to this invention a turbine bearing in a gas-turbine engine of the kind referred to, is mounted in a housing, which housing is supported by the stationary turbine structure or exhaust duct structure attached to said stationary turbine structure, by means of a series of radiating support members having radially sliding engagement with the turbine stationary structure or with the exhaust duct structure, thereby permitting relative radial expansion, whilst retaining the housing in centralised location.

The radiating members are conveniently in the form of hollow tubes and are adapted to carry lubricating fluid to the bearing and/or to carry cooling air to the bearing and rear face of the turbine rotor.

One construction of gas-turbine engine embodying the above and other features of the invention will now be described by way of example reference being made to the accompanying drawings, in which—

Figure 1 is a diagrammatic view of a gas-turbine engine of the type to which the invention is especially applicable, Figure 2 is a sectional view taken on the line 2—2 of Figure 1, and Figure 3 is a sectional view similar to Figure 2 but taken on a plane which is 90 degrees angularly removed from the plane of line 2—2 of Figure 1.

The gas-turbine engine is of relatively small diametral dimension and comprises a compressor 10 and a turbine 11 illustrated as a single-stage turbine, the rotors 10a, 11a of which are interconnected by a driving shaft 12. The compressor casing 10b and turbine casing 11b are interconnected by an intermediate casing 13 within which and around the shaft 12 there is provided combustion equipment 14 to which air is delivered from the compressor. Combustion gases pass from the combustion equipment 14 to the turbine 11 and then to an exhaust assembly 15 comprising a substantially conical fairing 16 and an outer casing 17 providing between them an annular exhaust duct registering at its inlet end with the turbine outlet and terminating in jet-pipe 18. As will be seen from the drawings, the outer casing 17 is double-walled, the inner wall 17a being spaced radially inwards from the outer wall 17b and forming the outer exhaust duct defining wall. The inner wall 17a will normally be made from sheet metal and the outer wall 17b will be stronger; it may for example be a casting.

The rotor assembly, that is the compressor rotor 10a, the shaft 12 and the turbine rotor 11a, is mounted in bearings, there being a bearing (not shown) at the forward end of the assembly a bearing 19 at the compressor end of shaft 12 and a bearing 20 at the turbine end of the assembly. Due to the lack of space in the intermediate casing 13 between the shaft 12 and combustion equipment 14 this latter bearing 20 is provided on a stub-shaft 21 rearwardly extending from the turbine rotor 11a and is accommodated within the fairing 16 of the exhaust assembly 15.

The bearing 20 comprises a series of balls or rollers located between the end of the stub-shaft 21 which carries the inner race of the bearing and an outer race mounted within a bearing housing. The housing comprises a dished disc 22 which is located axially beyond the end of the stub-shaft 21 with its convex surface facing towards the turbine and is provided with a hollow rim 23 on the convex face to encircle the end of the stub-shaft. The hollow rim supports a T-sectioned ring 24 carrying the outer race and a flanged ring 25 co-operating with an oil seal between the outer race and the stub-shaft 21 to form an oil seal. The bearing is thus enclosed within a chamber 26 constituted by the dished disc 22, the hollow rim 23, the T-sectioned ring 24 and oil seal ring 25.

The outer surface of the hollow rim 23 is formed with a series of four ports opening into the interior of the rim and is provided around the ports with seating surfaces 23a to which are secured the inner ends of four supporting members 27. The supporting members 27 are in the form of tubes and are bell-mouthed at their inner ends 28 to engage on the seating surfaces 23a. The tubes are symmetrically arranged around the rim 23 and extend outwardly through apertures in the fairing 16 and the inner and outer walls 17a and 17b of the outer casing 17 of the exhaust assembly 15 with which the tubes have a sliding engagement to permit relative radial expansion. For this purpose guide bushes 29 are mounted on the outer surface of the inner wall 17a of the outer casing 17, the guide bushes 29 being secured on a strengthening web 30 which is in turn secured on the outer surface of the inner wall 17a. The outer ends of the tubes 27 project beyond the bushes 29 and slidingly engage in bored bosses 17c formed on the outer wall 17b. The tubes 27 are inclined rearwardly and outwardly so that the outer ends of the tubes are positioned further to the rear of the engine than the inner ends of the tubes. In other words, the tubes 27 are not true radii of the axis of the engine.

The portions of the tubes 27 which engage with the guide bushes 29 are of circular cross-section and the parts which extend across the exhaust passage are preferably elliptical to facilitate their accommodation in aerofoil-section fairings 31 supporting the fairing 16 from the casing 17.

One opposite pair of the tubes 27 are connected at their outer ends to air pipe lines 32 whereby cooling air is delivered into the hollow rim 23 to cool the bearing housing. Ports 33 are formed in the rim permitting the cooling air to flow forwardly to the rear face of the turbine disc 11a and the air then flows outwardly between the disc 11a and an annular closure plate 34 which is supported from the fairing 16 to cool the turbine disc. The closure plate has at its inner radius an axially extending sleeve portion 35 which engages with the hollow rim.

The other pair of oppositely disposed tubes 27 accommodate oil pipe lines 36 which are of such diameter as to leave an air space between them and the tubes, one of the pipe lines passing through the hollow rim 23 and terminating in a nozzle 37 for directing lubricant onto the bearings 29. The oil pipe lines 36 slidingly engage at their outer ends in the ends of oil pipes 43, sealing means 43a being provided to prevent leakage of oil around the ends of the pipe lines 36 into the spaces between them and the tubes 27. An air bleed 38 is provided at the outer ends of these tubes to ensure that air circulates from the hollow rim through the air spaces between the pipe lines 36 and the tubes 27.

The tubes 27 are also formed with ports 39 opening into a double-walled insulation casing 40 which encloses the bearing housing and is located centrally within the fairing 16. The insulation casing 40 assists in preventing over-heating of the bearing. The cooling air flowing into it from the tubes 27 passes rearwardly between the walls of the casing to ports 41 located at its rear end and into the space between the casing 40 and the fairings 16. A louvred outlet 42 for the air is provided in the fairing 16 adjacent its apex. Guide bushes 44, similar to the guide bushes 29, are provided on each wall of the double-walled insulation casing 40 where the support tubes 27 pass through the walls, thus permitting relative expansion between the support tubes 27 of the heat insulation casing 40.

It will be appreciated from the foregoing description that the invention provides a simple construction of turbine bearing mounting in which the bearing is located rearwardly of the turbine and in which the bearing is effectively insulated from the effects of high-temperature exhaust gases. The invention also permits relative radial expansion between the bearing supporting structure and the casing of the gas-turbine engine and ensures that the bearing is accurately located.

We claim:

1. An axial-flow turbine comprising a turbine rotor, a shaft extending from said turbine rotor on the downstream side thereof, bearing means to support said shaft, a bearing housing to support said bearing means, stationary turbine structure surrounding said turbine rotor and supporting an exhaust assembly including a structural member secured to the turbine stationary structure and extending downstream of the turbine, an outer duct-defining wall accommodated within said structural member, and an inner duct-defining wall around said bearing housing and spaced radially inwards from the outer duct-defining wall, said inner and outer duct-defining walls affording between them an annular exit passage from said turbine, and a plurality of housing support members radiating from and secured at their inner ends to said bearing housing, said housing support members passing through said inner duct-defining wall and said outer duct-defining wall with freedom for movement lengthwise of themselves with respect to said inner duct-defining wall and with respect to said outer duct-defining wall, and being directly engaged at their outer ends with said structural member to be supported thereby and to have sliding freedom lengthwise of themselves with respect to said structural member.

2. An axial-flow turbine as claimed in claim 1, wherein said bearing housing is formed with a hollow rim encircling said bearing, and wherein one at least of the housing support members is formed with a passage extending axially therethrough, and comprising means to supply cooling air under pressure to said passage, and a connection between the inner end of said passage and said hollow rim.

3. An axial-flow turbine as claimed in claim 1, wherein the housing support members are located in axial planes and are inclined rearwardly from true radii through their points of attachment to the bearing housing.

4. An axial-flow turbine comprising a turbine rotor, a rotor shaft extending from said turbine rotor on the downstream side thereof, bearing means to support said rotor shaft, a bearing housing to support said bearing means, stationary turbine structure surrounding said turbine rotor and supporting an exhaust assembly including a structural member secured to the stationary turbine structure and extending downstream of the turbine, an outer duct-defining wall accommodated within said structural member, and an inner duct-defining wall around said bearing housing and spaced radially inwards from the outer duct-defining wall, said inner and outer duct-defining walls affording between them an annular exit passage from said turbine, an insulation casing enclosing said bearing housing and located within the inner duct-defining wall, and a plurality of housing support members secured at their inner ends to said bearing housing, said housing support members extending outwardly from the bearing housing through the insulation casing and inner and outer duct-defining walls to engage with said structural member at their outer ends and said housing support members having sliding freedom lengthwise of themselves with respect to said structural member, said outer duct-defining wall, said inner duct-defining wall and said insulation casing.

5. An axial-flow turbine as claimed in claim 4, wherein said insulation casing is formed as a double-walled structure with an air-space between the walls and means is provided for supplying cooling air to the air-space.

6. An axial-flow turbine comprising a turbine rotor assembly including a turbine disc and a shaft element extending from the turbine disc on the exhaust side thereof, stationary turbine structure accommodating the turbine rotor assembly and supporting inner and outer wall structures extending downstream from the turbine disc to define a turbine exhaust annulus, a bearing for the shaft element, a bearing housing for the bearing, the bearing and bearing housing being accommodated within the inner wall structure, and a plurality of bearing housing support members secured by their inner ends to the bearing housing and extending outwardly from the bearing housing to pass freely through the inner wall structure and to engage slidingly by their outer ends with the outer wall structure, whereby the bearing housing is located from the outer wall structure and said support members are free for relative thermal expansion with respect to the inner and outer wall structures lengthwise of themselves.

7. An axial-flow turbine as claimed in claim 6, comprising also a heat insulation casing accommodated within the inner wall structure and surrounding the bearing housing, said housing support members passing through and having sliding engagement with the heat insulation casing.

8. An axial-flow turbine as claimed in claim 7, wherein said housing comprises a hollow rim encircling the bearing, the heat insulation casing is a double-walled structure with an air-space between its walls, and one at least of the housing support members is formed as a cooling-air-supply tube opening at its inner end into the hollow rim and having outlet ports into the air-space.

FREDERICK WILLIAM
    WALTON MORLEY.
TERENCE EDWARD GOUVENÔT
      GARDINER.

REFERENCES CITED

The following references are of record in the file of this patent:

UNITED STATES PATENTS

| Number | Name | Date |
|---|---|---|
| 2,414,788 | Altorfer et al. | Jan. 28, 1947 |
| 2,414,814 | Johnson | Jan. 28, 1947 |
| 2,439,447 | Buck et al. | Apr. 13, 1948 |
| 2,442,019 | Ray | May 25, 1948 |
| 2,479,573 | Howard | Aug. 23, 1949 |